No. 642,923. Patented Feb. 6, 1900.
F. RHIND.
LAMP.
(Application filed Sept. 29, 1899.)
(No Model.) 2 Sheets—Sheet 1.
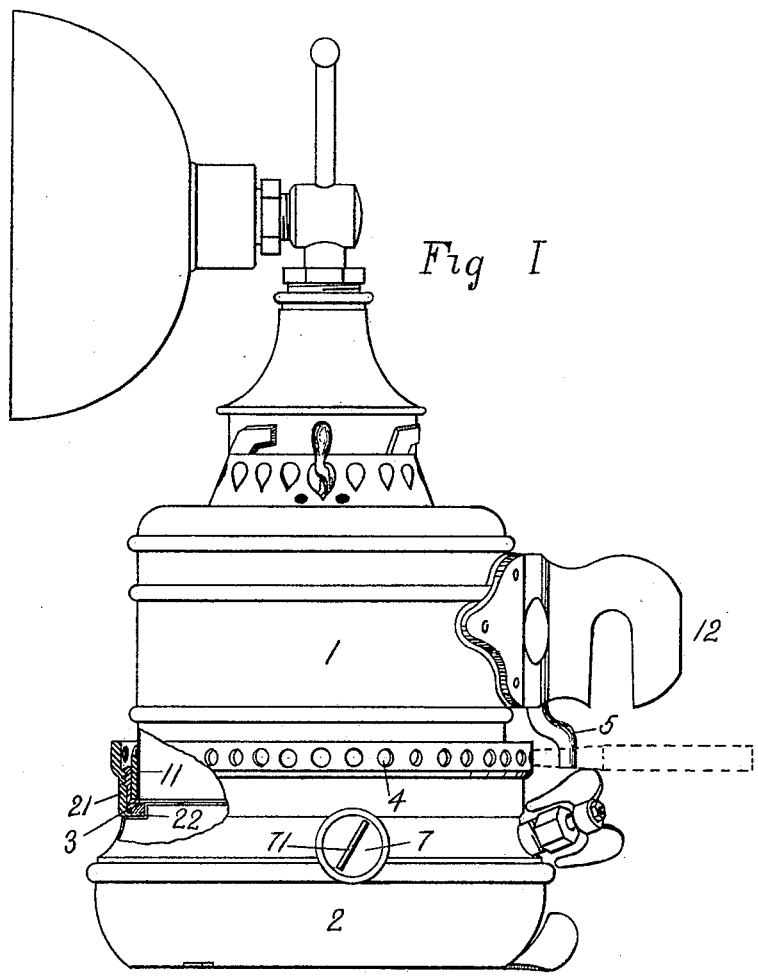
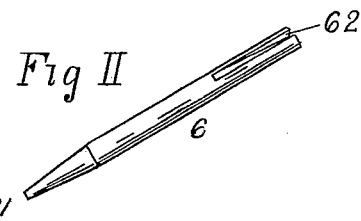
WITNESSES:
E. W. Todd
INVENTOR
BY
ATTORNEY.
THE NORRIS PETERS CO., PHOTO-LITHO., WASHINGTON, D. C.

No. 642,923. Patented Feb. 6, 1900.
F. RHIND.
LAMP.
(Application filed Sept. 29, 1899.)
(No Model.) 2 Sheets—Sheet 2.
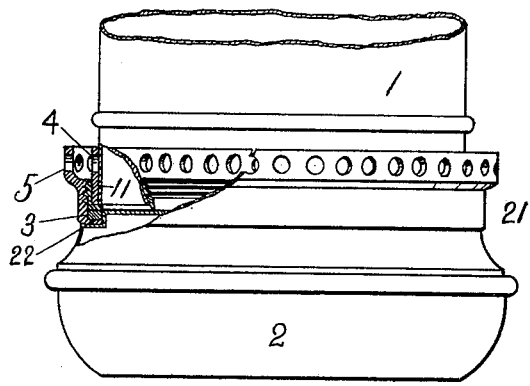
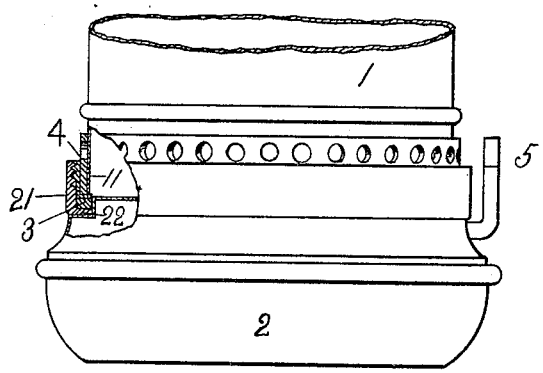
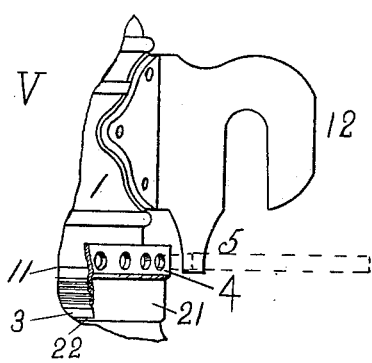
WITNESSES:
E. W. Todd
L. M. Segee
INVENTOR
Frank Rhind
BY Geo. L. Cooper
ATTORNEY

UNITED STATES PATENT OFFICE.

FRANK RHIND, OF BRIDGEPORT, CONNECTICUT, ASSIGNOR OF ONE-HALF TO THE BRIDGEPORT BRASS COMPANY, OF SAME PLACE.

LAMP.

SPECIFICATION forming part of Letters Patent No. 642,923, dated February 6, 1900.

Application filed September 29, 1899. Serial No. 732,070. (No model.)

*To all whom it may concern:*

Be it known that I, FRANK RHIND, a citizen of the United States, residing at Bridgeport, Connecticut, have invented a new and useful Improvement in Lamps, of which the following is a specification:

My invention relates to a form of coupling used to connect two parts of a lamp or the like where a fluid-tight joint is required. It is especially applicable to joints in acetylene-lamps which are liable to be "stuck" by chemical erosion or mechanical action.

In the accompanying drawings, Figure I is an elevation, partly broken away, of an acetylene cycle-lamp embodying my invention. Fig. II is a lever or handle. Figs. III, IV, and V show modifications in the form of my device.

1 and 2 designate, respectively, the upper and lower portions of a lamp-body; 11 21, screw-threads; 12, a bracket-lug; 22, an annular flange containing a washer 3; 4 and 5, lever-engaging portions; 6, a lever pointed at 61 and slotted at 62; 7, a feeder-cap ribbed at 71.

In the example of my invention illustrated in Figs. I and II of the drawings the body portions 1 and 2 of the gas generator or lamp may be of any desired form. As shown, the upper portion 1 has a thickened and externally-threaded portion 11, which engages with an internal thread 21 on the portion 2. A bracket-lug 12 is secured at the rear of the body portion 1, affording the usual means for attaching the lamp to a connecting-bracket. (Not shown in the drawings.) An inwardly and upwardly projecting flange 22 within the wall of the portion 2 and beneath the thread 21 supports a resilient washer 3, against which the wall of the upper portion 1 abuts. A lever-engaging rack 4 is shown as a continuous perforate band slightly offset from and extending above the thread 22 on the portion 2. A second lever-engaging portion 5 is shown as a downwardly-projecting pin secured to the bracket-lug 12 and offset from the portion 1, so as to be in a horizontal plane with and a short distance outside of the rack 4 when the portions 1 and 2 are in their operative positions. A feeder-cap 7 (shown as on the portion 2 of the lamp) is provided with a raised rib or projection 71. A lever 6 (shown in Fig. II and indicated in dotted lines in Fig. I of the drawings) has one end 61 pointed and the other end provided with a slot 62.

The action of the lever in tightening or starting the screw-threads 11 21 is shown in dotted lines, Fig. I. It is clear that the point 61 of the lever may be inserted in any one of the perforations in the band 4 and that the lever may fulcrum against either side of the lug 5. By means of the longitudinal slot 62 the lever 6 is adapted to engage with the raised rib 71 on the feeder-cap 7 either to screw it into position or to loosen it. As it is necessary that this feeder-opening should have both a liquid and a gas tight closure, this mode of using a lever is quite important.

In Fig. III of the drawings I have shown a reversal of the positions of the perforate band 4 and pin 5, by which obviously the operation of the device will not be altered.

Fig. IV shows both portions 1 and 2 of the lamp or generator provided with lever-engaging portions in the shape of perforate bands 4 and 5, with an annular space between them. It is clear that in this construction the point 61 of lever 6 would pass through the perforations in the outer band 5 and into those in the inner band 4. The operation of the device would be the same as before described, except that the lever in this case may be engaged at any point on the periphery of either portion of the lamp.

In Fig. V of the drawings I have shown the lever-engaging or fulcrum pin as an integral depending portion of the bracket-lug. It is clear that the operation of the device is precisely like that of Fig. I.

The operation of the device will be readily understood from an inspection of the drawings. In lamps or generators for the production of acetylene or like gas it is necessary that perfectly tight joints should be made. It has been the practice, therefore, to screw together by hand the solid and the liquid-containing parts, with a rubber or like washer interposed between their meeting edges. In the device patented August 29, 1899, No. 631,820, on my application a segmental toothed rack and a pin in connection with a segmentally-toothed wrench are employed both to secure a tighter joint than could be made by hand and to provide leverage to unlock the parts when stuck by erosion of the rubber or other cause. This short segmental rack was sufficient to turn the parts upon each other for the distance required by the bayonet-joint engagement shown in that patent. It was found to be objectionable in that it brought all the strain upon the small part of the shell to which it was riveted or otherwise attached. It was further found in the practical use of the lamp that the rubber washers used were soon destroyed or torn by the adhesion to them of the residual lime and that it was impracticable to procure these washers of the same thickness. This rendered it necessary to abandon the bayonet-joint for a continuous screw-thread, which greatly increased the limit of toleration for the thickness of the washer. This in turn rendered the short rack useless. Hence the production of the continuous rack upon one of the screw-threaded parts, which in connection with the engaging pin upon the other portion and a suitable lever is the device of the present invention. By further substituting for the projecting teeth of the former rack, which was liable to hurt the operator's hand in the preliminary screwing together of the parts, the smooth perforate band shown I have rendered the device cheaper, neater, and stronger. I have also found it convenient to secure the fulcrum-pin to or make it a part of the bracket-lug or portion of the lamp by which it is secured to a holder. In this position it is inconspicuous, convenient, and, as in the case of the perforate rack, not apt to hurt the hand of the operator in screwing the parts together.

It will be understood that my present invention is intended as an improvement on that set forth in United States Patent No. 631,820, above named.

What I claim is—

1. In a lamp-coupling in combination two body portions, screw-threads on said portions adapted to engage each other, a lever-engaging device consisting of a substantially circumferential rack on one of said body portions and a second lever-engaging portion on the other of said body portions, substantially as described.

2. In a lamp-coupling in combination two body portions, screw-threads on said portions adapted to engage each other, a lever-engaging device consisting of a substantially circumferential perforate band on one of said body portions and a second lever-engaging portion on the other of said body portions, substantially as described.

3. In a lamp-coupling two body portions, screw-threads on said portions adapted to engage each other, a lever-engaging device consisting of a substantially circumferential rack on one of said body portions, a second lever-engaging portion on the other of said body portions in combination with a lever adapted to coöperate with said lever--engaging portions to rotate one of said body portions on the other, substantially as described.

4. In a lamp-coupling two body portions, screw-threads on said portions adapted to engage each other, a lever-engaging device consisting of a substantially circumferential perforate band on one of said body portions, a second lever-engaging portion on the other of said body portions in combination with a lever adapted to coöperate with said lever-engaging portions to rotate one of said body portions on the other, substantially as described.

5. In a lamp-coupling in combination two body portions, screw-threads on said portions adapted to engage each other, a substantially circumferential rack on one of said body portions and a lug or pin on the other of said body portions and substantially in the same plane with said rack when said body portions are screwed together, substantially as described.

6. In a lamp-coupling in combination two body portions, screw-threads on said portions adapted to engage each other, a substantially circumferential perforate band on one of said body portions and a lug or pin on the other of said body portions and substantially in the same plane with said band when said body portions are screwed together, substantially as described.

7. A lever or tool of the class described provided with means for engaging simultaneously with coacting locking devices on a plurality of parts of a lamp-body and with other means for engaging with a feeder-cap or like closure, substantially as described.

FRANK RHIND.

Witnesses:
GEO. L. COOPER,
NETTIE S. WELLS.